(12) United States Patent
Xie

(10) Patent No.: US 10,884,605 B2
(45) Date of Patent: Jan. 5, 2021

(54) METHODS AND SYSTEMS FOR DISPLAYING HIDDEN INFORMATION ON A WEB PAGE

(71) Applicant: Tencent Technology (Shenzhen) Company Limited, Shenzhen (CN)

(72) Inventor: Yi Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 108 days.

(21) Appl. No.: 15/945,602

(22) Filed: Apr. 4, 2018

(65) Prior Publication Data

US 2018/0225019 A1    Aug. 9, 2018

Related U.S. Application Data

(63) Continuation of application No. PCT/CN2017/071696, filed on Jan. 19, 2017.

(30) Foreign Application Priority Data

Jan. 26, 2016    (CN) .......................... 2016 1 0051989

(51) Int. Cl.
*G06F 3/0486* (2013.01)
*G06F 21/62* (2013.01)
(Continued)

(52) U.S. Cl.
CPC ........ *G06F 3/0486* (2013.01); *G06F 3/04842* (2013.01); *G06F 3/04886* (2013.01);
(Continued)

(58) Field of Classification Search
CPC ............... G06F 3/04842; G06F 3/0486; G06F 21/6245; G06F 3/04886; G06F 2221/032;
(Continued)

(56) References Cited

U.S. PATENT DOCUMENTS

2002/0061778 A1* 5/2002 Acres ...................... G07F 17/32
463/40
2007/0050729 A1* 3/2007 Kawamura ............ H04N 7/147
715/781
(Continued)

FOREIGN PATENT DOCUMENTS

CN     102043563 A     5/2011
CN     102663056 A     9/2012
(Continued)

OTHER PUBLICATIONS

Tencent Technology, Written Opinion, PCT/CN2017/071696, dated Mar. 22, 2017, 6 pgs.
(Continued)

*Primary Examiner* — Andrey Belousov
(74) *Attorney, Agent, or Firm* — Morgan, Lewis & Bockius LLP

(57) ABSTRACT

The present disclosure discloses an information obtaining method performed at a terminal, the method including: displaying a web page, where the web page includes a scan window control and at least one hidden information region; when the scan window control is dragged, detecting whether an overlap exists between the scan window control and the hidden information region; and if an overlap exists between the scan window control and the hidden information region, displaying hidden information located in an overlap region between the scan window control and the hidden information region. In the present disclosure, a web page is scanned by using a scan window control, and hidden information in a hidden information region of the web page is obtained. The hidden information needs to be obtained by means of interaction with a user, so that a problem that a manner in which information is presented in the web page is excessively simplex, and the user often ignores the presented information.

12 Claims, 10 Drawing Sheets

(51) Int. Cl.
*H04M 1/725* (2006.01)
*G06F 3/0484* (2013.01)
*G06F 3/0488* (2013.01)

(52) U.S. Cl.
CPC .... *G06F 21/6245* (2013.01); *H04M 1/72561* (2013.01); *G06F 2221/032* (2013.01)

(58) Field of Classification Search
CPC .. G06F 21/6218; G06F 3/04845; G06F 21/31; G06F 21/62; G06F 2221/2107; H04M 1/72561; A63F 13/70; G06T 3/4015
See application file for complete search history.

(56) References Cited

U.S. PATENT DOCUMENTS

| | | | | |
|---|---|---|---|---|
| 2009/0259967 | A1* | 10/2009 | Davidson | G06F 3/0481 715/799 |
| 2010/0074149 | A1 | 3/2010 | Terada et al. | |
| 2010/0259560 | A1* | 10/2010 | Jakobson | G06F 21/62 345/629 |
| 2016/0062552 | A1* | 3/2016 | Jeong | G06F 3/0481 715/788 |

FOREIGN PATENT DOCUMENTS

| | | |
|---|---|---|
| CN | 103186331 A | 7/2013 |
| CN | 103677542 A | 3/2014 |
| CN | 104346403 A | 2/2015 |
| CN | 105809054 A | 7/2016 |
| JP | A 05250124 A | 9/1993 |
| JP | 2003248417 A | 9/2003 |
| JP | 2004110719 A | 4/2004 |
| KR | 20020033832 A | 5/2002 |
| KR | 10143587 A | 8/2014 |

OTHER PUBLICATIONS

Tencent Technology, IPRP, PCT/CN2017/071696, Jul. 31, 2018, 7 pgs.
Tencent Technology, ISR, PCT/CN2017/071696, Mar. 22, 2017, 2 pgs.

* cited by examiner

METHODS AND SYSTEMS FOR DISPLAYING HIDDEN INFORMATION ON A WEB PAGE

PRIORITY CLAIM AND RELATED APPLICATION

This application is a continuation application of PCT/CN2017/071696, entitled "INFORMATION ACQUISITION METHOD AND DEVICE" filed on Jan. 19, 2017, which claims priority to Chinese Patent Application No. 201610051989.8, entitled "INFORMATION ACQUISITION METHOD AND DEVICE" filed on Jan. 26, 2016, all of which are incorporated by reference in their entirety.

FIELD OF THE TECHNOLOGY

Embodiments of the present disclosure relate to the field of web page display, and in particular, to an information obtaining method and apparatus.

BACKGROUND OF THE DISCLOSURE

As terminals such as smartphones and tablet computers are widely used, currently, service providers are already used to deliver information to users by providing web pages in the terminals, for example, product information introduction, activity promotion, or product advertising campaign.

When delivering information to a user, a service provider usually displays preset information directly on a web page. After entering the web page by using a terminal, the user may directly read the preset information on the web page. To enhance interactivity between the user and the web page, the service provider may also set a text question on the web page, and the user can enter the next web page after correctly answering the text question.

In the foregoing manner, information delivered by the service provider to the user is usually directly displayed on the web page, and interaction between the web page and the user is limited to only question and answer. Consequently, the entire interaction manner is excessively simplex.

SUMMARY

To resolve the problem that information delivered by a service provider to a user is usually directly displayed on a web page, interaction between the web page and the user is limited to only question and answer, and the entire interaction manner is excessively simplex, embodiments of the present disclosure provide an information obtaining method and apparatus. The technical solution is as follows:

According to one aspect of the embodiments of the present disclosure, an information obtaining method is performed at a terminal having one or more processors and memory storing one or more programs to be executed by the one or more processors, the method comprising:

displaying a web page, the web page comprising a scan window control and at least one hidden information region, the scan window control being configured to be dragged to different regions on the web page, and the hidden information region comprising hidden information in a hide display state;

detecting, when the scan window control is dragged, whether an overlap exists between the scan window control and the hidden information region; and displaying, in accordance with a determination that an overlap exists between the scan window control and the hidden information region, the hidden information located in an overlap region between the scan window control and the hidden information region.

According to another aspect of the embodiments of the present disclosure, a terminal comprises one or more processors, memory, and one or more programs being stored in the memory, wherein the one or more programs, when executed by the one or more processors, cause the terminal to perform the aforementioned information obtaining method.

According to yet another aspect of the embodiments of the present disclosure, a non-transitory computer readable storage medium stores one or more programs, wherein the one or more programs, when executed by a terminal having one or more processors, cause the terminal to perform the aforementioned information obtaining method.

The technical solutions provided in the embodiments of the present disclosure bring the following advantageous effects:

A web page is displayed. The web page includes a scan window control and at least one hidden information region. When the scan window control is dragged, whether an overlap exists between the scan window control and the hidden information region is detected. If an overlap exists between the scan window control and the hidden information region, hidden information located in an overlap region between the scan window control and the hidden information region is displayed. The problem that information delivered by a service provider to a user is usually directly displayed on a web page, interaction between the web page and the user is limited to only question and answer, and the entire interaction manner is excessively simplex, is resolved. The web page is scanned by using the scan window control, and the hidden information in the hidden information region of the web page is obtained. The hidden information needs to be obtained by means of interaction with the user, so that a manner in which information is presented on the web page is diversified, the information is presented in an more interesting manner, and the user pays more attention to the presented information.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

For ease of understanding, first, some technology concepts involved in embodiments of the present disclosure are introduced.

Mask Layer

The mask layer is a layer enabling information in a lower layer to be in a hide display state. When needing to display only a part of information in a web page, a user may use the mask layer to shield information that does not be displayed in the web page, so that the information that does not be displayed is in the hide display state.

Figure 1:
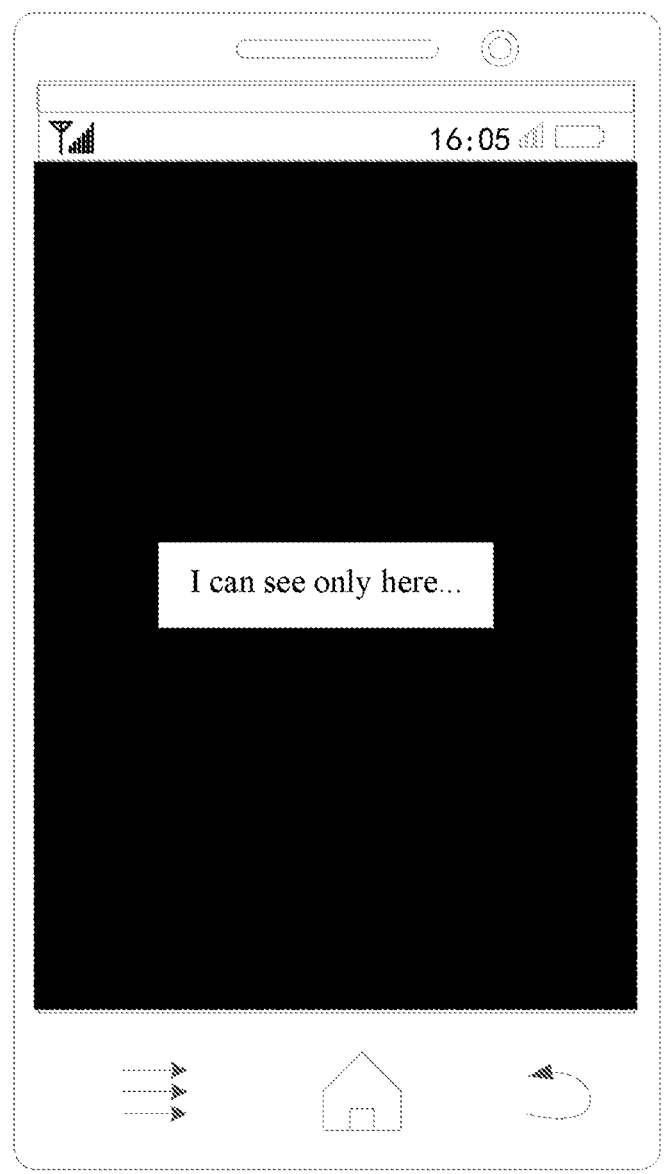
FIG. 1 is a schematic structural diagram of a mask layer in a web page according to a related technology.

For example, assuming that the user desires to prevent information in the web page from being seen by others when viewing the web page by using a terminal, the user selects to display a part of information in the web page of the terminal. Assuming that the user needs to display only information in a rectangular region in the web page, the user adds a mask layer in the web page of the terminal. The mask layer may shield the other region in the web page except the region displaying the information. As shown in FIG. 1, a black region is a position of the mask layer, and the rectangular region is a region displaying the information.

Figure 2:
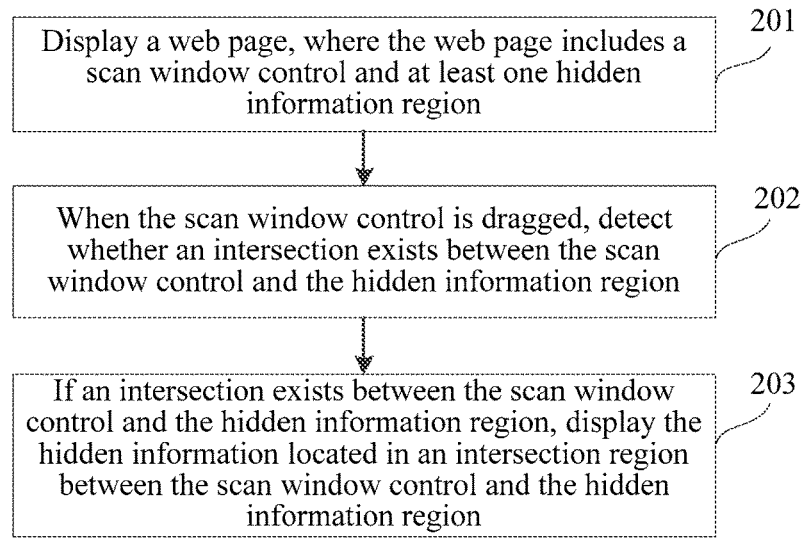
FIG. 2 is a flowchart of an information obtaining method according to an exemplary embodiment of the present disclosure.

Referring to FIG. 2, FIG. 2 is a flowchart of an information obtaining method according to an exemplary embodiment of the present disclosure. This embodiment is described by using an example in which the method is applied to a web page of a terminal. The method includes the following operations:

Operation 201: Display a web page, where the web page includes a scan window control and at least one hidden information region.

The scan window control is capable of being dragged to different regions on the web page, and the hidden information region includes hidden information in a hide display state.

Optionally, the web page is a Hypertext Markup Language 5 (HTML5) page, or a web page supporting the FLASH technology.

Optionally, the hidden information region is a region in which a mask layer is used to achieve a hiding effect, and the scan window control is configured to remove the mask layer in a position in which the scan window control is located.

Operation 202: When the scan window control is dragged, detect whether an overlap exists between the scan window control and the hidden information region.

Operation 203: If an overlap exists between the scan window control and the hidden information region, display the hidden information located in an overlap region between the scan window control and the hidden information region.

Based on the above, in the information obtaining method provided in this embodiment, a web page is displayed. The web page includes a scan window control and at least one hidden information region. When the scan window control is dragged, whether an overlap exists between the scan window control and the hidden information region is detected. If an overlap exists between the scan window control and the hidden information region, hidden information located in an overlap region between the scan window control and the hidden information region is displayed. The problem that information delivered by a service provider to a user is usually directly displayed on a web page, interaction between the web page and the user is limited to only question and answer, and the entire interaction manner is excessively simplex, is resolved. The web page is scanned by using the scan window control, and the hidden information in the hidden information region of the web page is obtained. The hidden information needs to be obtained by means of interaction with the user, so that a manner in which information is presented on the web page is diversified, the information is presented in an more interesting manner, and the user pays more attention to the presented information.

It should be noted that, the terminal in the embodiments of the present disclosure may be a smartphone, a tablet computer, an e-book reader, an MP3 (Moving Picture Experts Group Audio Layer III) player, an MP4 (Moving Picture Experts Group Audio Layer IV) player, a portable laptop computer, a desktop computer, and the like. Optionally, a browser used to browse web pages are installed in the terminal. Alternatively, the terminal has another application (APP) capable of browsing web pages, for example, has a social client capable of browsing web pages. That is, the information obtaining method in the embodiments of the present disclosure may be performed by a browser in the terminal or a social client capable of browsing web pages.

In a possible implementation, the implementation is described by using an example in which the terminal is a smartphone. The information obtaining method shown in the embodiment of FIG. 2 may be applied in a usage scenario shown in FIG. 3 below.

Figure 3:
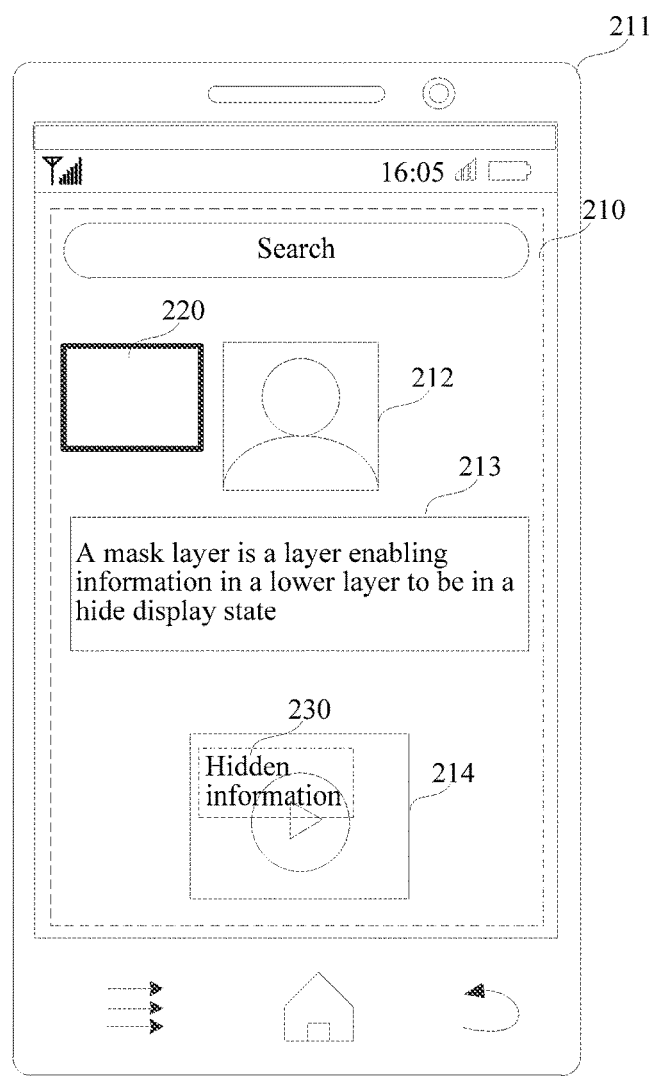
FIG. 3 is a schematic diagram of a scenario in which an information obtaining method is used according to an exemplary embodiment of the present disclosure.

The usage scenario shown in FIG. 3 includes a web page 210, a scan window control 220 and a hidden information region 230.

The web page 210 may be any web page in the terminal. Optionally, the web page 210 includes at least the scan window control 220 and at least one hidden information region 230.

Optionally, the web page 210 may further include at least one of a picture 212, a text 213, a video 214, and the like, which are used to present content of information in the web page 210.

The scan window control 220 may be a control capable of being dragged to different regions on the web page 210. Optionally, a size of the scan window control 220 is less than that of the web page 210.

The hidden information region 230 includes hidden information in a hide display state. When the scan window control 220 is dragged to form an overlap region with the hidden information region 230, the hidden information in the overlap region may be displayed.

Optionally, the hidden information region 230 further includes a mask layer (not shown in FIG. 3). The mask layer is configured to shield the hidden information in the hidden information region 230, so that the hidden information is in the hide display state.

It should be noted that, in an initial state, the hidden information region 230 is invisible. That is, in the initial state, no intersection exists between the scan window control 220 and the hidden information region 230. In this case, "the hidden information" in the embodiment of FIG. 3 is not displayed.

In this case, specific operations for implementing the information obtaining method in the embodiment of FIG. 2 are as follows: first displaying the web page in the terminal; dragging, by a user, the scan window control 220 in the web page 210; when the scan window control 220 is dragged, detecting, by the terminal, whether an overlap exists between the scan window control 220 and the hidden information region 230; and when an overlap exists between the scan window control 220 and the hidden information region 230, displaying the hidden information located in the overlap region between the scan window control 220 and the hidden information region 230 in the terminal.

Referring to FIG. 4, FIG. 4 is a flowchart of an information obtaining method according to another exemplary embodiment of the present disclosure. This embodiment is described by using an example in which the information obtaining method is applied to the usage scenario shown in FIG. 3. The method includes the following operations:

Operation 401: Display a web page, where the web page includes a scan window control and at least one hidden information region.

The scan window control is capable of being dragged to different regions on the web page, and the hidden information region includes hidden information in a hide display state.

A terminal displays a web page in a display interface, where the web page includes a scan window control and at least one hidden information region.

The scan window control is configured to scan the hidden information in the hidden information region of the web page. The hidden information region includes the hidden information in the hide display state.

Optionally, the web page is an HTML5 page, or a web page supporting the FLASH technology.

Optionally, the hidden information region is a region in which a mask layer is used to achieve a hiding effect, and the scan window control is configured to remove the mask layer in a position in which the scan window control is located.

For example, the hidden information region includes expansion information about content displayed in the web page, an answer to a correlated question in the web page, a password for entering a next web page correlated with presented information, and the like. In this embodiment, content of the hidden information included in the hidden information region is not specifically limited.

Optionally, the web page may include at least one of a text, a picture, a video, and other information, which is used to deliver and promote content displayed in the web page.

Optionally, the hidden information region is located in a lower layer of the content displayed in the web page.

Optionally, the hidden information region may further include the mask layer. The mask layer is configured to shield the hidden information in the hidden information region, so that the hidden information is in the hide display state.

Operation 402: When the scan window control is dragged, detect whether an overlap exists between the scan window control and the hidden information region.

The scan window control is dragged in the web page of the terminal. While the scan window control is dragged, it is detected that whether an overlap exists between a region scanned by the scan window control and the hidden information region.

That is, a position of the hidden information region in the web page is fixed, but the scan window control may be dragged in the web page. While a user drags the scan window control in the web page, it is detected whether the scan window control is moved to the hidden information region and whether an overlap exists between a region in which the scan window control is located and the hidden information region.

If no intersection exists between the scan window control and the hidden information region, the user continues dragging the scan window control in the web page, to continue performing operation 402.

Operation 403: If an overlap exists between the scan window control and the hidden information region, display preset prompt information.

The preset information includes an animation effect based on the scan window control, and/or, an animation effect based on the web page, and/or, a preset prompt tone.

If it is detected that an overlap exists between the scan window control and the hidden information region, the preset prompt information is displayed. The preset prompt information is used to indicate that the hidden information region exists nearby the scan window control.

Optionally, an execution body configured to present the preset prompt information may be the scan window control. For example, when an overlap exists between the scan window control and the hidden information region, the scan window control can generate the animation effect, or the scan window control can flicker, or the scan window control can generate the predetermine prompt tone.

Optionally, the execution body configured to present the preset prompt information may be the web page. For example, when an overlap exists between the scan window control and the hidden information region, the web page can generate the animation effect, or content displayed in the web page has a preset change, or the web page can flicker.

Figure 4A:
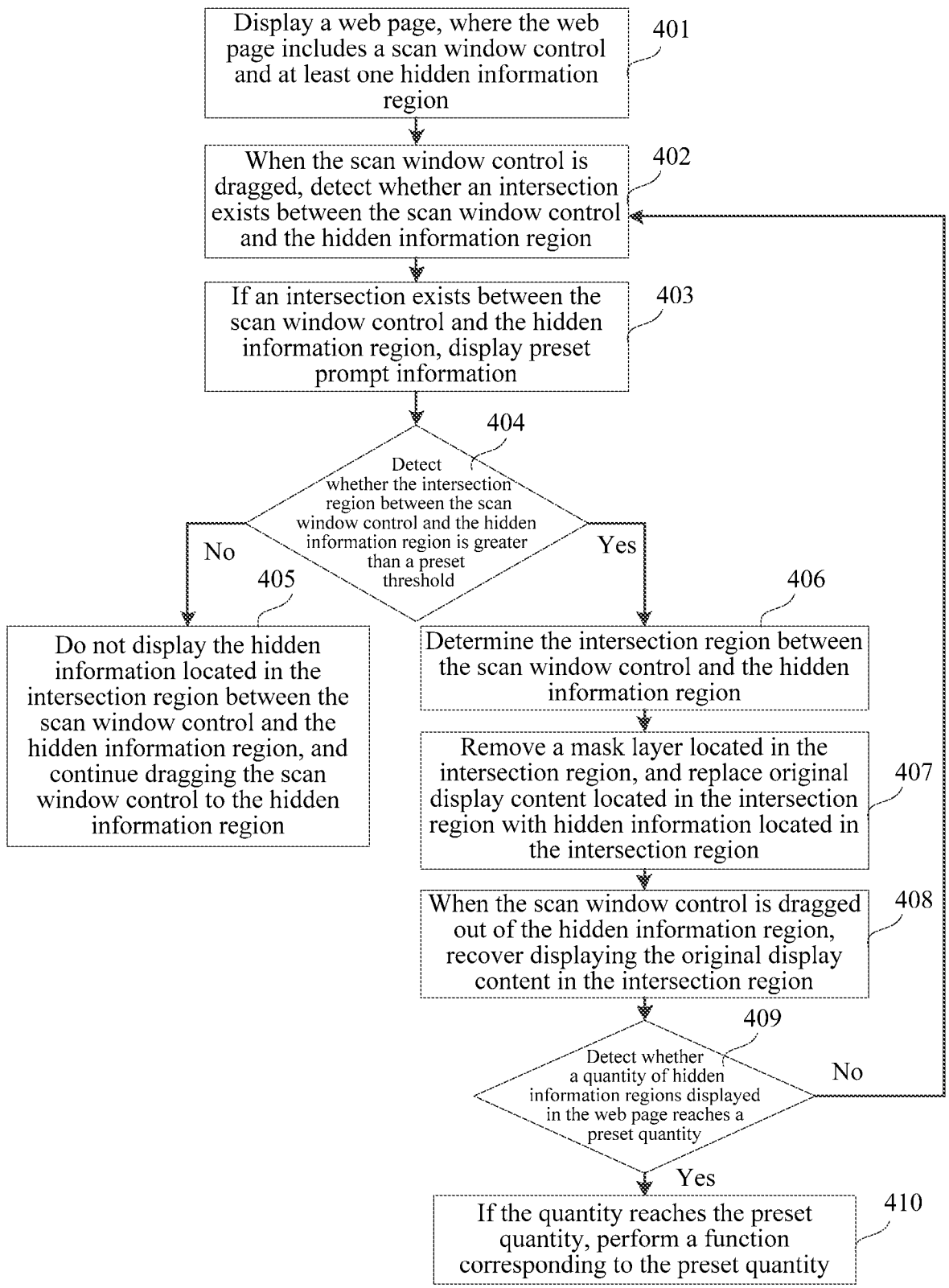
FIG. 4A is a flowchart of an information obtaining method according to another exemplary embodiment of the present disclosure.
Figure 4B:
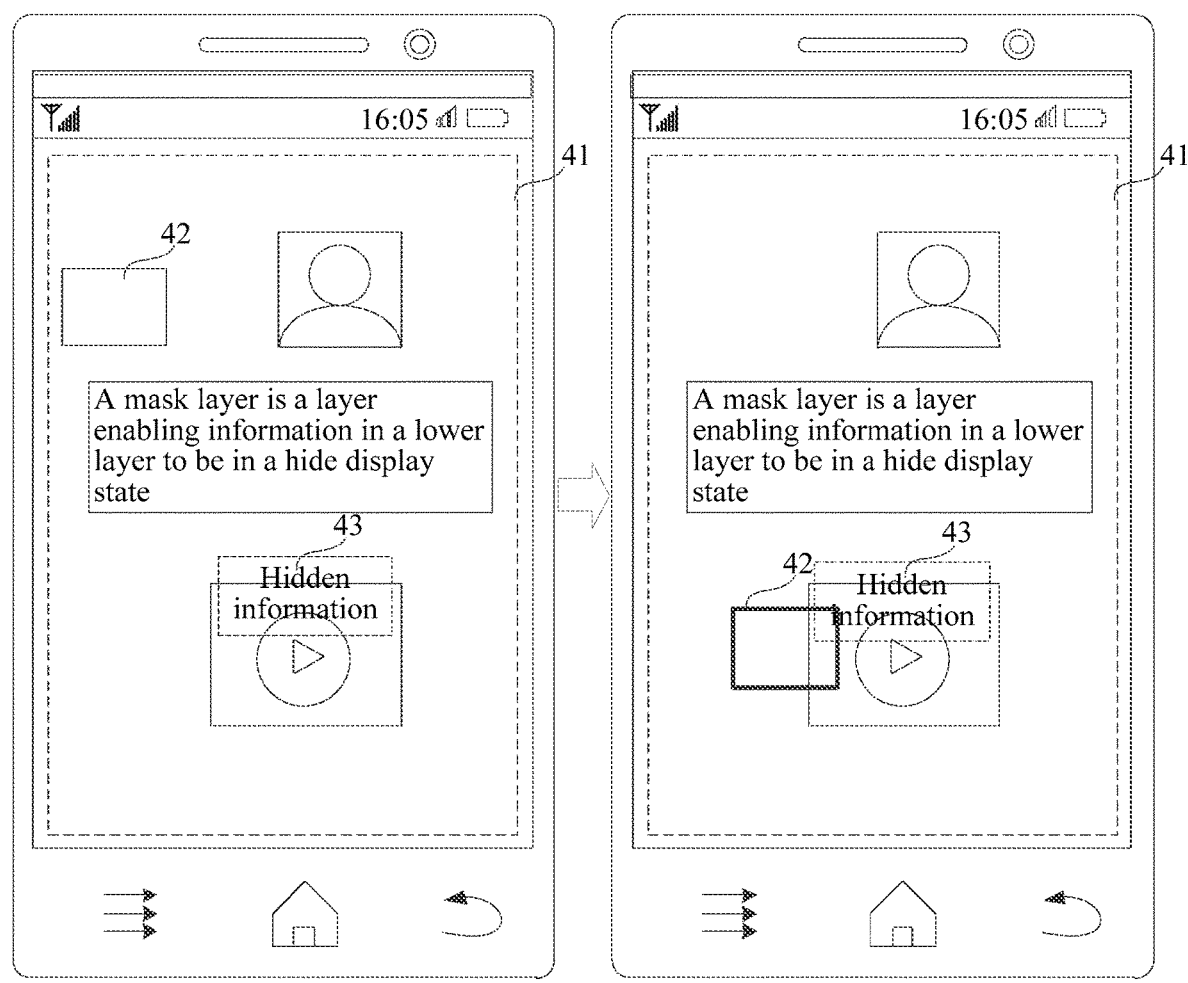
FIG. 4B is a schematic diagram of a scan window control presenting prompt information according to an exemplary embodiment of the present disclosure.

For example, when the user drags a scan window control 42 in a web page 41 and an overlap exists between the scan window control 42 and a hidden information region 43, a frame of the scan window control 41 becomes bold, as shown in FIG. 4B. It should be noted that, the hidden information region 43 shown in the embodiment of FIG. 4B is not displayed in an actual implementation process, and the "hidden information" shown in FIG. 4B is only for ease of understanding.

Operation 404: Detect whether the overlap region between the scan window control and the hidden information region is greater than a preset threshold.

When an overlap exists between the scan window control and the hidden information region, it is detected whether the overlap region between the scan window control and the hidden information region is greater than the preset threshold.

Optionally, when an overlap exists between the scan window control and the hidden information region, the terminal further calculates an area of the intersection between the scan window control and the hidden information region, and compares the area that is obtained by means of calculation with the preset threshold, to detect whether the area that is obtained by means of calculation is greater than the preset threshold.

Optionally, when an overlap exists between the scan window control and the hidden information region, a ratio of an area that is of the intersection between the scan window control and the hidden information region and that accounts for the scan window control is calculated, and the ratio that is obtained by means of calculation is compared with the preset threshold, to detect whether the ratio that is obtained by means of calculation is greater than the preset threshold.

In this embodiment, a form in which the overlap region between the scan window control and the hidden information region is greater than the preset threshold is not specifically limited.

Operation 405: If the overlap region between the scan window control and the hidden information region is less than the preset threshold, do not display the hidden information located in the overlap region between the scan window control and the hidden information region.

Operation 406: If the overlap region is greater than the preset threshold, determine the overlap region between the scan window control and the hidden information region.

When the overlap region between the scan window control and the hidden information region is greater than the preset threshold, the overlap region between the scan window control and the hidden information region is determined.

Figure 4C:
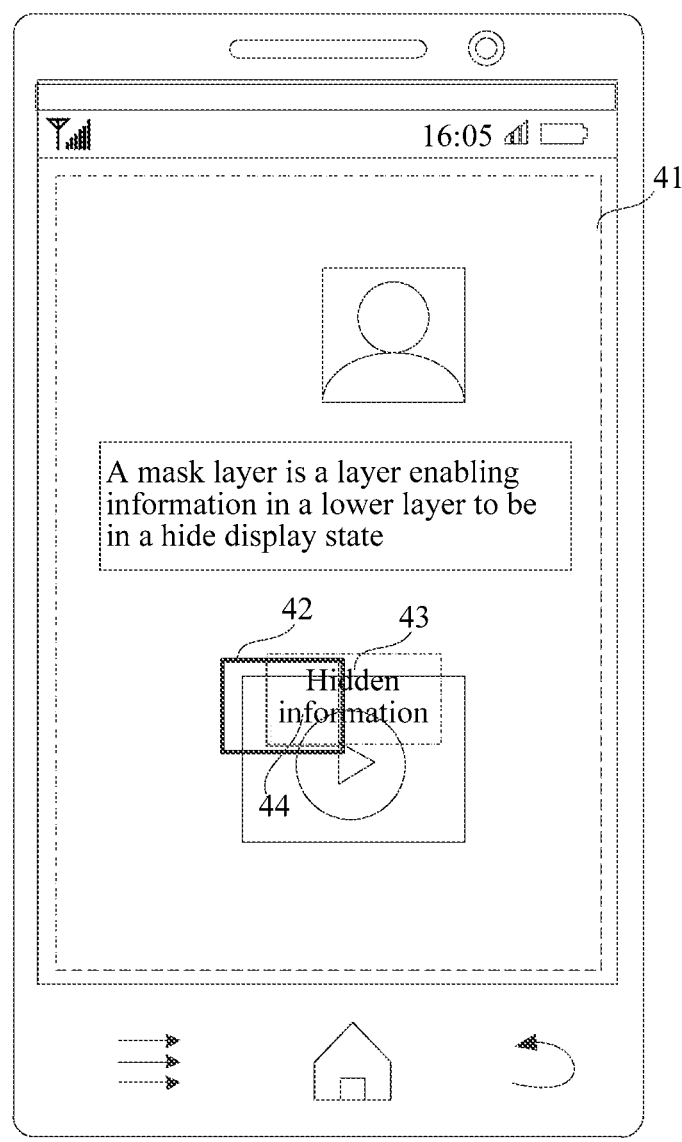
FIG. 4C is a schematic diagram of an overlap region between a scan window control and a hidden information region according to an exemplary embodiment of the present disclosure.

For example, in the web page 41, when the area of the overlap region between the scan window control 42 and the hidden information region 43 is greater than a half area of the scan window control 42, an overlap region 44 between the scan window control 42 and the hidden information region 43 is determined, as shown in FIG. 4C. It should be noted that, the hidden information region 43 shown in FIG. 3, the embodiment of FIG. 4B and the embodiment of FIG. 4C is not displayed in an initial state, and the "hidden information" shown in FIG. 3, the embodiment of FIG. 4B and FIG. 4C is only for ease of understanding by readers.

Operation 407: Remove a mask layer located in the overlap region, and display hidden information located in the overlap region.

After the overlap region between the scan window control and the hidden information region is determined, the mask layer located in the overlap region is removed, and original display content located in the overlap region is replaced by the hidden information located in the overlap region. It should be noted that, the "replaced" herein refers to a sense from a visual angle of the user, and is not an operation actually performed by the terminal. In other words, the terminal needs to remove only the mask layer located in the overlap region, so that the hidden information located in the overlap region can be automatically displayed. From the visual angle of the user, the original display content is replaced by the hidden information located in the overlap region.

Optionally, the hidden information region includes the mask layer. The mask layer and the hidden information exist at the same time, and the mask layer is configured to enable the hidden information to be in the hide display state. That is, the mask layer exists in an upper layer of the hidden information, and is configured to shield the hidden information. After enabling the hidden information to be in the hide display state, the mask layer and the hidden information hides in currently displayed content in the web page at the same time.

After the mask layer in the overlap region is removed, the originally display content located in the overlap region is replaced by the hidden information located in the overlap region.

For example, in FIG. 4C, "hidden" in the "hidden information" may be displayed, but "information" is kept in a hidden state.

Figure 4D:
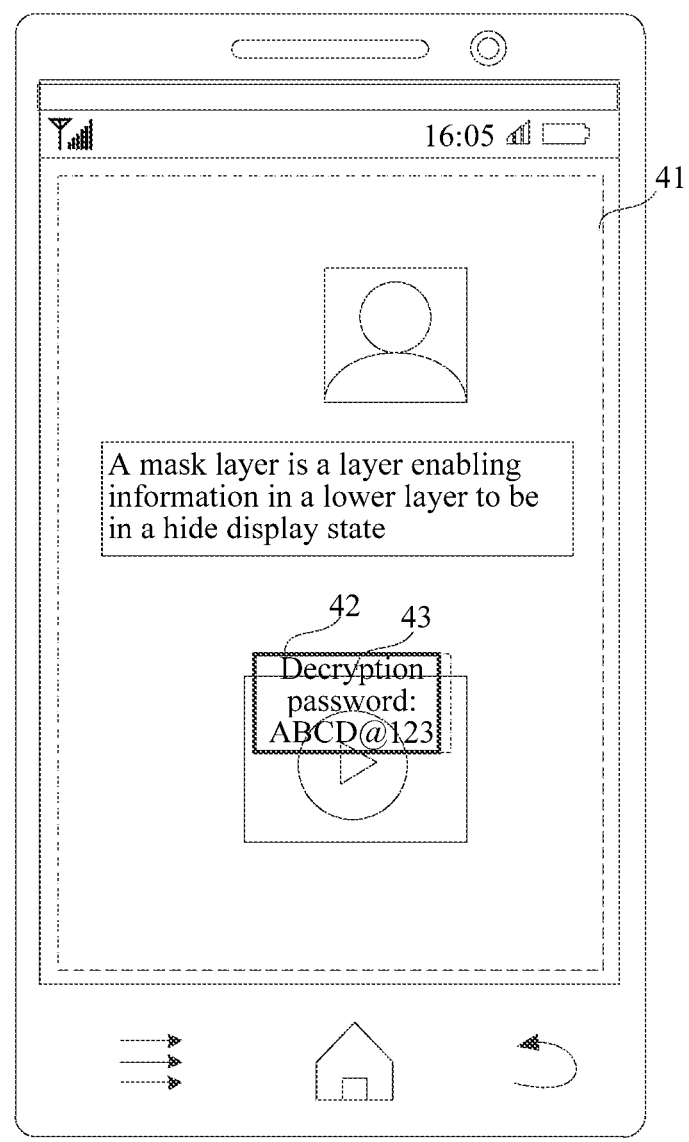
FIG. 4D is a schematic diagram of an overlap region displaying hidden information according to an exemplary embodiment of the present disclosure.

For example, the hidden information in the hidden information region 43 is "decryption password: ABCD@123". When an overlap region between the scan window control 42 and the hidden information region 43 is determined, the mask layer located in the overlap region is removed, and the original display content located in the overlap region is replaced by the hidden information located in the overlap region, to obtain information of "decryption password: ABCD@123", as shown in FIG. 4D.

For example, in a web page of a game, key information about updating the game, an activation code of the game, a tool of the game, a password of the game, and the like that are in the hidden information region may be obtained by using the scan window control.

For another example, in a web page of product information promotion, a time for issuing the product, a qualification for participating in an activity of the product, a download password for downloading documents of the product, and the like that are in the hidden information region may be obtained by using the scan window control.

Operation 408: When the scan window control is dragged out of the hidden information region, recover displaying the original display content in the overlap region.

After the scan window control is dragged to the hidden information region and the hidden information in the hidden information region is obtained, the scan window control is dragged out of the hidden information region. When the scan window control is dragged out of the hidden information region, the web page recovers displaying the original content in the overlap region.

That is, after the scan window control is dragged out of the hidden information region, the web page recovers displaying the original content, and does not display the hidden information in the hidden information region.

Figure 4E:
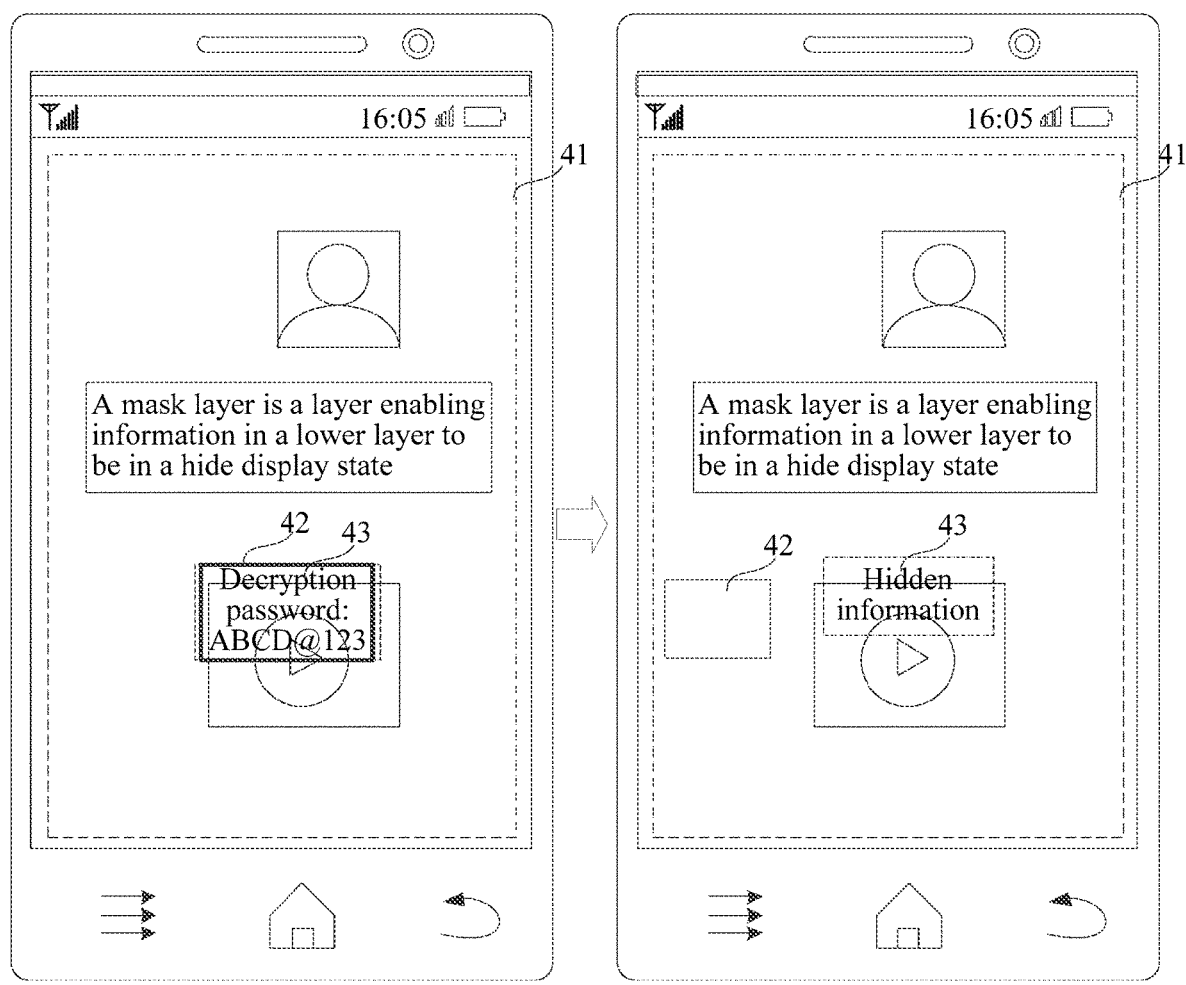
FIG. 4E is a schematic diagram after a scan window control is dragged out of a hidden information region according to an exemplary embodiment of the present disclosure.

For example, based on FIG. 4D, after the information of "decryption password: ABCD@123" is obtained, the user drags the scan window control 42 out of the hidden information region 43, to recover displaying the original display content in the overlap region, as shown in FIG. 4E. It needs to be noted that, in the schematic diagram on the right side of FIG. 4E, in the original state, the hidden information region 43 is not displayed, and the hidden information region 43 is displayed in the web page in FIG. 4E only for ease of understanding by readers.

In an optional embodiment, the following interaction operations are further included.

Operation 409: Detect whether a quantity of hidden information regions displayed in the web page exceeds a preset quantity.

There may be multiple hidden information regions in a same web page, for example, three or five hidden information regions. After the user finds all hidden information regions, a deeper interaction function may also be triggered.

Schematically, after the scan window control is dragged out of the hidden information region, the terminal obtains the quantity of the hidden information regions displayed in the web page, and detects whether the obtained quantity of the displayed hidden information regions reaches the preset quantity.

The preset quantity is a quantity that is set in advance, for example, 3 or 5.

Operation 410: If the quantity reaches the preset quantity, perform a function corresponding to the preset quantity.

The function corresponding to the preset quantity includes at least one of displaying preset information, granting a qualification for participating in a preset activity, issuing a virtual tool, issuing an activation code, or granting a download permission.

When detecting that the quantity of the hidden information regions displayed in the web page reaches the preset quantity, the terminal performs the function corresponding to the preset quantity.

For example, in the web page of the product information promotion, after the user detects that a quantity of the hidden information regions in the web page reaches the preset quantity by using the scan window control, the web page can grant a qualification for participating in a the preset activity. For another example, in the web page of the game, after the user detects that a quantity of the hidden information regions in the web page reaches the preset quantity by using the scan window control, the user may obtain a virtual tool of the game issued in the web page, or the user may obtain an activation code of a next game.

Figure 4F:
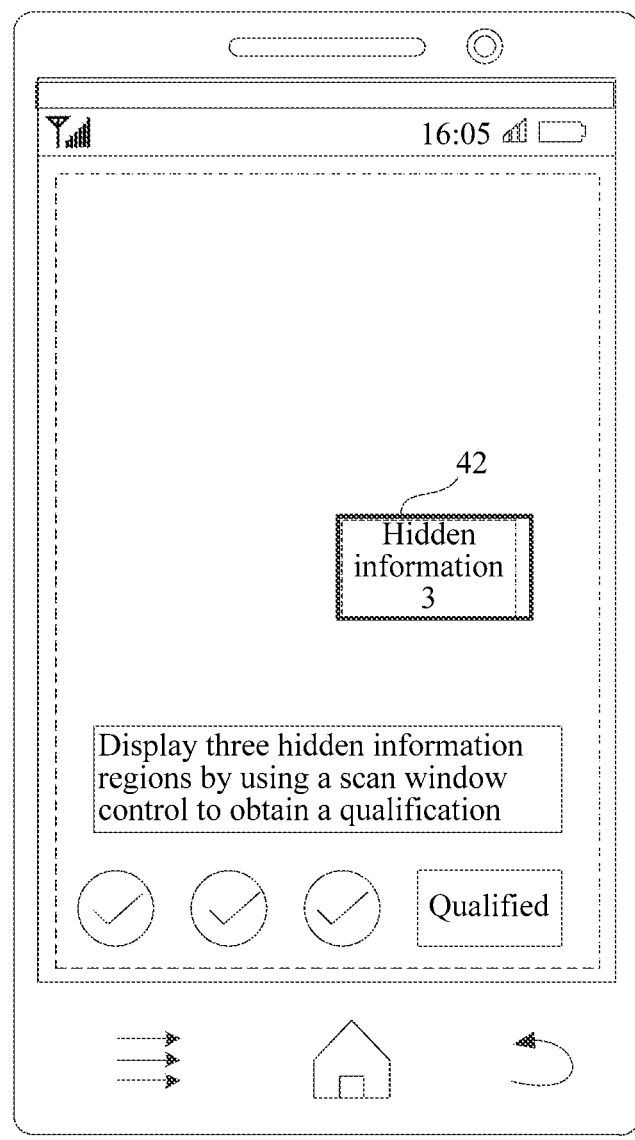
FIG. 4F is a schematic diagram of obtaining a permission password according to an exemplary embodiment of the present disclosure.

For example, after hidden information in three hidden information regions is obtained by using the scan window control 42, a qualification for participating in the preset activity may be obtained, as shown in FIG. 4F.

If the quantity does not meet the preset quantity, return to operation 402.

Based on the above, in the information obtaining method provided in this embodiment, a web page is displayed. The web page includes a scan window control and at least one hidden information region. When the scan window control is dragged, whether an overlap exists between the scan window control and the hidden information region is detected. If an overlap exists between the scan window control and the hidden information region, hidden information located in an overlap region between the scan window control and the hidden information region is displayed. The problem that information delivered by a service provider to a user is usually directly displayed on a web page, interaction between the web page and the user is limited to only question and answer, and the entire interaction manner is excessively simplex, is resolved. The web page is scanned by using the scan window control, and the hidden information in the hidden information region of the web page is obtained. The hidden information needs to be obtained by means of interaction with the user, so that a manner in which information is presented on the web page is diversified, the information is presented in an more interesting manner, and the user pays more attention to the presented information.

According to the information obtaining method provided in this embodiment, multiple hidden information regions are provided in a same web page. When a quantity of hidden information regions displayed in the web page reaches the preset quantity, the function corresponding to the preset quantity is performed, thereby implementing a deeper interaction form between the web page and the user, attracting the user to reside on the web page for a longer period of time, and increasing a possibility that information on the web page is effectively obtained by the user.

In a specific embodiment, a web page of a terminal includes a background content layer, a hidden content layer, a mask layer, and an interaction trigger layer.

The background content layer is a common information presentation page, and is configured to present information in the web page.

The hidden content layer is a layer including hidden information, and is configured to store the hidden information in a hide display state.

The mask layer is configured to enable the hidden information in the hidden content layer to be in the hide display state.

Optionally, the hidden content layer and the mask layer forms the hidden information region in the embodiment of FIG. 3. The hidden content layer and the mask layer hide in the background content layer, but the hidden content layer and the mask layer both are in an invisible state.

The scan window control is also referred to as the interaction trigger layer, and is configured to be dragged in the web page to scan the hidden information region in the web page.

When the scan window control is dragged to the hidden information region, the mask layer in an overlap region between the scan window control and the hidden information region is removed, and information in the overlap region in the hidden content layer is displayed.

Assuming that information content displayed in the background content layer includes text information "the mask layer is a layer enabling information in a lower layer to be in a hide display state". The hidden content layer and the mask layer are hidden in the text information "information in a lower layer" in the background content layer. The hidden information in the hidden content layer is "password: abcd". When the scan window control is dragged to a region in which the mask layer is located, the mask layer is removed, and the hidden information "password: abcd" in the hidden content layer is displayed in the terminal. When the scan window control is dragged out of the region in which the mask layer is located, "information in a lower layer" in the background content layer is displayed in the terminal.

It needs to be noted that, the background content layer, the hidden content layer, the mask layer, and the scan window control do not display information by using a layer-by-layer method, and the hidden content layer and the mask layer only hide in the background content layer without affecting display information of the background content layer in the web page.

Figure 5:
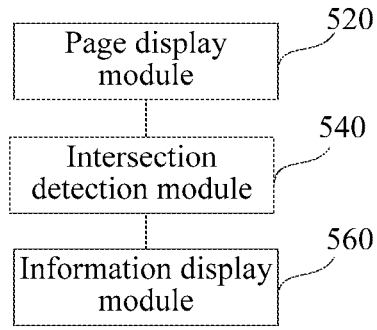
FIG. 5 is a structural block diagram of an information obtaining apparatus according to an embodiment of the present disclosure.

Referring to FIG. 5, FIG. 5 is a structural block diagram of an information obtaining apparatus according to an embodiment of the present disclosure. The information obtaining apparatus may form all or a part of a terminal by using software, hardware, or a combination thereof. The information obtaining apparatus includes:

a page display module 520, configured to display a web page, where the web page includes a scan window control and at least one hidden information region; the scan window control is capable of being dragged to different regions on the web page; and the hidden information region includes hidden information in a hide display state;

an intersection detection module 540, configured to detect, when the scan window control is dragged, whether an overlap exists between the scan window control and the hidden information region; and an information display module 560, configured to: if an overlap exists between the scan window control and the hidden information region, display the hidden information located in an overlap region between the scan window control and the hidden information region.

Based on the above, in the information obtaining apparatus provided in this embodiment, a web page is displayed. The web page includes a scan window control and at least one hidden information region. When the scan window control is dragged, whether an overlap exists between the scan window control and the hidden information region is detected. If an overlap exists between the scan window control and the hidden information region, hidden information located in an overlap region between the scan window control and the hidden information region is displayed. The problem that information delivered by a service provider to a user is usually directly displayed on a web page, interaction between the web page and the user is limited to only question and answer, and the entire interaction manner is excessively simplex, is resolved. The web page is scanned by using the scan window control, and the hidden information in the hidden information region of the web page is obtained. The hidden information needs to be obtained by means of interaction with the user, so that a manner in which information is presented on the web page is diversified, the information is presented in an more interesting manner, and the user pays more attention to the presented information.

Figure 6:
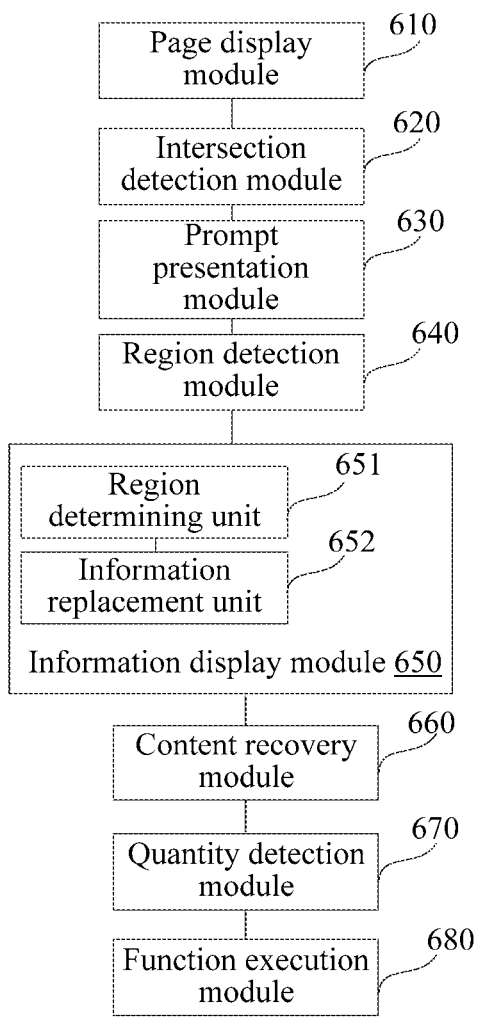
FIG. 6 is a structural block diagram of an information obtaining apparatus according to another embodiment of the present disclosure.

Referring to FIG. 6, FIG. 6 is a structural block diagram of an information obtaining apparatus according to another embodiment of the present disclosure. The information obtaining apparatus may form all or a part of a terminal by using software, hardware, or a combination thereof. The information obtaining apparatus includes the following modules:

A page display module 610 is configured to display a web page, where the web page includes a scan window control and at least one hidden information region; the scan window control is capable of being dragged to different regions on the web page; and the hidden information region includes hidden information in a hide display state.

An intersection detection module 620 is configured to detect, when the scan window control is dragged, whether an overlap exists between the scan window control and the hidden information region.

A prompt presentation module 630 is configured to: if an overlap exists between the scan window control and the hidden information region, present preset prompt information, where the preset information includes an animation effect based on the scan window control, and/or, an animation effect based on the web page, and/or, a preset prompt tone.

A region detection module 640 is configured to detect whether the overlap region between the scan window control and the hidden information region is greater than a preset threshold.

An information display module 650 is configured to: if an overlap exists between the scan window control and the hidden information region, display the hidden information located in an overlap region between the scan window control and the hidden information region.

Optionally, the information display module 650 is further configured to: if the overlap region is greater than the preset threshold, perform the operation of displaying the hidden information located in an overlap region between the scan window control and the hidden information region.

Optionally, the hidden information region includes a mask layer. The mask layer is configured to shield the hidden information in the hidden information region, so that the hidden information is in the hide display state.

In this embodiment, the information display module 650 may include a region determining unit 651 and an information replacement unit 652.

The region determining unit 651 is configured to determine the overlap region between the scan window control and the hidden information region.

The information display unit 652 is configured to: remove the mask layer in the overlap region, and replace original display content located in the overlap region with the hidden information located in the overlap region.

A content recovery module 660 is configured to: when the scan window control is dragged out of the hidden information region, recover displaying the original display content in the overlap region.

A quantity detection module 670 is configured to detect whether a quantity of hidden information regions displayed in the web page exceeds a preset quantity.

A function execution module 680 is configured to: if the quantity reaches the preset quantity, perform a function corresponding to the preset quantity.

The function corresponding to the preset quantity includes at least one of displaying preset information, granting a qualification for participating in a preset activity, issuing a virtual tool, issuing an activation code, or granting a download permission.

Based on the above, in the information obtaining apparatus provided in this embodiment, a web page is displayed. The web page includes a scan window control and at least one hidden information region. When the scan window control is dragged, whether an overlap exists between the scan window control and the hidden information region is detected. If an overlap exists between the scan window control and the hidden information region, hidden information located in an overlap region between the scan window control and the hidden information region is displayed. The problem that information delivered by a service provider to a user is usually directly displayed on a web page, interaction between the web page and the user is limited to only question and answer, and the entire interaction manner is excessively simplex, is resolved. The web page is scanned by using the scan window control, and the hidden information in the hidden information region of the web page is obtained. The hidden information needs to be obtained by means of interaction with the user, so that a manner in which information is presented on the web page is diversified, the information is presented in an more interesting manner, and the user pays more attention to the presented information.

According to the information obtaining apparatus provided in this embodiment, multiple hidden information regions are provided in a same web page. When a quantity of hidden information regions displayed in the web page reaches the preset quantity, the function corresponding to the preset quantity is performed, thereby implementing a deeper interaction form between the web page and the user, attracting the user to reside on the web page for a longer period of time, and increasing a possibility that information on the web page is effectively obtained by the user.

It should be noted that, when the information obtaining apparatus provided in this embodiment obtains information, division of the foregoing functional modules is merely used as an example for description. In practical application, the foregoing functional allocation can be implemented by different functional modules according to needs. That is, an internal structure of the device is divided into different functional modules to implement all of or a part of functions described above. In addition, the information obtaining apparatus provided in the foregoing embodiments and the embodiment of the information obtaining method belong to a same concept. Refer to the method embodiment for a specific implementation process, and details are not described herein again.

Figure 7:
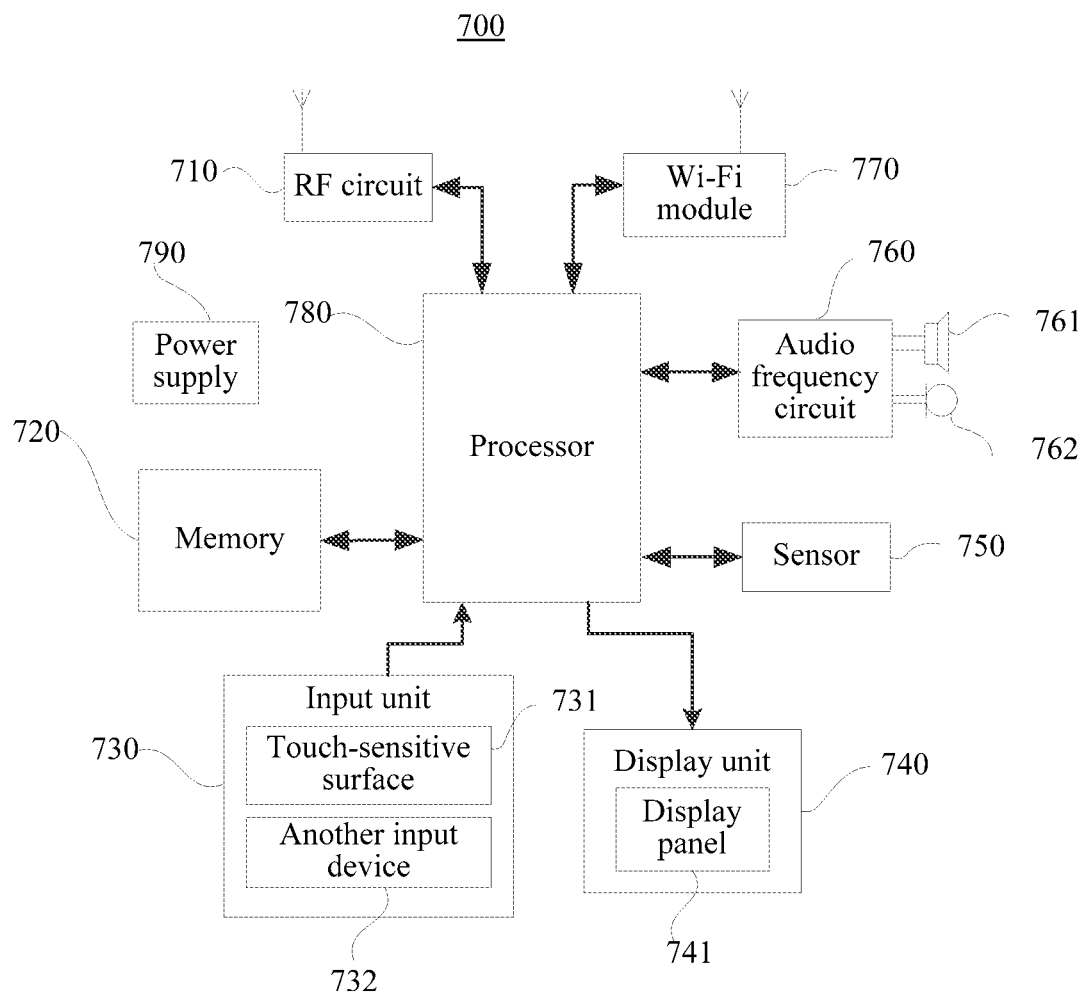
FIG. 7 is a structural block diagram of a terminal according to another embodiment of the present disclosure.

Referring to FIG. 7, FIG. 7 is a schematic structural diagram of a terminal according to an embodiment of the present disclosure. The terminal may be applied to implement the information obtaining method provided in the foregoing embodiments. Specifically:

A terminal 700 may include parts such as a radio frequency (RF) circuit 710, a memory 720 including one or more non-transitory computer readable storage media, an input unit 730, a display unit 740, a sensor 750, an audio frequency circuit 760, a Wireless Fidelity (Wi-Fi) module 770, a processor 780 including one or more processing core, and a power supply 790. A person skilled in the art may understand that, the terminal structure shown in FIG. 7 does not limit the structure, and may include more or less parts than illustrated in the figure, combine some parts, or use a different part layout.

The RF circuit 710 may be configured to receive and send a signal during receiving/sending information or a call. Particularly, the RF circuit 710 sends downlink information to one or more processors 780 for processing after receiving the downlink information from a base station. In addition, the RF circuit 710 sends uplink data to the base station. The RF circuit 710 usually includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 710 may further communicate with a network and another device by means of wireless communication. The wireless communication may use any communication standard or protocol, including but is not limited to, Global System of Mobile Communication (GSM), General Packet Radio Service (GPRS), Code Division Multiple Access (CDMA), Wideband Code Division Multiple Access (WCDMA), Long Term Evolution (LTE), an email, or a short messaging service (SMS).

The memory 720 may be configured to store software programs and modules, and the processor 780 performs various functions and data processing by running the software programs and the module stored in the memory 720. The memory 720 may mainly include a program storage region and a data storage region. The program storage region may store an operating system, an application needed by at least one function (for example, a sound playback function or an image playback function), and the like. The data storage region may store data (for example, audio data and a phone book) created according to use of the terminal 700 and the like. In addition, the memory 720 may include a high-speed random access memory, or may include a non-volatile memory, for example, at least one magnetic disk storage device, a flash storage device, or another non-volatile solid state storage device. Correspondingly, the memory 720 may further include a memory controller, so that the processor 780 and the input unit 730 can access the memory 720.

The input unit 730 may be configured to receive input digital or character information, and generate a keyboard, a mouse, an operating rod, an optical or a trackball signal input that is related to user settings and function control. Specifically, the input unit 730 may include a touch-sensitive surface 731 and another input device 732. The touch-sensitive surface 731 is also referred to as a touchscreen or a touch panel, may collect a touch operation that is performed by a user on or near the touch-sensitive surface 731 (for example, an operation that is performed by a user by using any appropriate object or accessory such as a finger or a stylus on or near the touch-sensitive surface 731), and drive a corresponding connection apparatus according to a preset program. Optionally, the touch-sensitive surface 731 may include a touch detection apparatus and a touch controller. The touch detection apparatus detects a touch position of the user, detects a signal caused by the touch operation, and transmits the signal to the touch controller. The touch controller receives touch information from the touch detection apparatus, converts the touch information into a touch point coordinate, sends the touch point coordinate to the processor 780, and can receive an instruction from the processor 780 and execute the instruction. In addition, the touch-sensitive surface 731 may be implemented by using multiple types such as a resistive type, a capacitive type, an infrared type, and a surface acoustic wave type. In addition to the touch-sensitive surface 731, the input unit 730 may further include the another input device 732. Specifically, the another input device 732 may include, but is not limited to, one or more of a physical keyboard, a function key (for example, a volume control key and an on/off key), a trackball, a mouse, and an operating rod.

The display unit 740 may be configured to display information entered by the user or information provided to the user and various graphical user interfaces of the terminal 700. The graphical user interfaces may include a graph, a text, an icon, a video, and any combination thereof. The display unit 740 may include a display panel 741. Optionally, a liquid crystal display (LCD), an organic light-emitting diode (OLED), or the like may be used to configure the display panel 741. Further, the touch-sensitive surface 731 may cover the display panel 741. After detecting an operation on or near the touch-sensitive surface 731, the touch-sensitive surface 731 transmits the operation to the processor 780 to determine a type of the touch event. Subsequently, the processor 780 provides a corresponding visual output on the display panel 741 according to the type of the touch event. In FIG. 7, the touch-sensitive surface 731 and the display panel 741 are used as two separate parts to implement input and output function. However, in some embodiments, the touch-sensitive surface 731 and the display panel 741 may be integrated to implement the input and output functions.

The terminal 700 may further include at least one type of sensor 750, for example, an optical sensor, a motion sensor, and another sensor. Specifically, the optical sensor may include an ambient light sensor and a proximity sensor. The ambient light sensor may adjust the luminance of the display panel 741 according to the brightness of ambient light. The proximity sensor may turn off the display panel 741 and/or backlight when the sensor 700 moves to an ear. As a motion sensor, an acceleration sensor may detect an acceleration in any direction (usually three axes). When the acceleration sensor is stationary, the acceleration sensor may detect the size and direction of a gravity, may be configured to identify a posture of a mobile phone (for example, horizontal and vertical screen switching, a related game, or magnetometer posture calibration) and perform vibration identification of related functions (for example, a pedometer and knocking), and so on. The terminal 700 may alternatively be provided with another type of sensor such as a gyroscope, a barometer, a hydrometer, a thermometer, or an infrared sensor, and details are not described herein.

The audio frequency circuit 760, a speaker 761, and a microphone 762 may provide an audio frequency interface between the user and the terminal 700. The audio frequency circuit 760 may convert received audio frequency data into an electrical signal, and transmit the electrical signal to the speaker 761. The speaker 761 converts the electrical signal into an audio signal and outputs the audio signal. On the other side, the microphone 762 converts a collected audio signal into an electrical signal. The audio frequency circuit 760 receives the electrical signal and converts the electrical signal into audio frequency data, and outputs the audio frequency data to the processor 780 for processing. For example, the processed audio frequency data is sent to another terminal by using the RF circuit 710, or the audio frequency data is output to the memory 720 for further processing. The audio frequency circuit 760 may further include an earplug jack, so that a peripheral earphone can communicate with the terminal 700.

Wi-Fi is a short-range wireless transmission technology. The terminal 700 may assist the user in receiving and sending an e-mail, browsing a web page, accessing streaming medium, and the like by using the Wi-Fi module 770. This provides wireless broadband Internet access to the user. FIG. 7 shows the Wi-Fi module 770, but it may be understood that, the Wi-Fi module 770 is not a necessary part of the terminal 700, and may be completely omitted as required without departing from the scope of the essence of the present disclosure.

The processor 780 is a control center of the terminal 700, connects to each part of the whole terminal by using various interfaces and lines, and performs various functions and data processing of the terminal 700 by operating or executing the software programs and/or modules stored in the memory 720 and invoking the data stored in the memory 720, to perform monitoring of the entire mobile phone. Optionally, the processor 780 may include one or more processing cores. Preferably, the processor 780 may integrate an application processor and a modem processor. The application processor mainly processes an operating system, a user interface, an application, and the like. The modem processor mainly processes wireless communication. It may be understood that, the modem processor may alternatively be not integrated into the processor 780.

The terminal 700 may further includes the power supply 790 (for example, a battery) supplying power to each part. Preferably, the power supply may be logically connected to the processor 780 by using a power supply management system, to implement functions such as charging, discharging, and power consumption management by using the power supply management system. The power supply 790 may further include any component such as one or more DC or AC power supplies, a recharging system, a power supply fault detection circuit, a power supply converter or inverter, and a power supply status indicator.

Although not shown in the figure, the terminal 700 may further include a camera, a Bluetooth module, and the like, and details are not described herein. Specifically, in this embodiment, the display unit of the terminal 700 is a touchscreen display. The terminal 700 may further include a memory and one or more programs. The one or more programs are stored in the memory, and are executed by one or more processor by means of configuration. The one or more programs include instructions used for performing each operation in the foregoing information obtaining method.

In an exemplary embodiment, a non-transitory computer readable storage medium including instructions is further provided, for example, a memory including instructions. The instructions may be executed by a processor in a terminal to complete the information obtaining method shown in the embodiment of FIG. 2A or the embodiment of FIG. 4. For example, the non-transitory computer readable storage medium may be a ROM, a random access memory (RAM), a CD-ROM, a magnetic tape, a floppy disk, an optical data storage device, or the like.

The sequence numbers of the foregoing embodiments of the present disclosure are merely for illustrative purposes, and are not intended to indicate priorities of the embodiments.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An information obtaining method performed at a terminal having one or more processors and memory storing one or more programs to be executed by the one or more processors, the method comprising:
    displaying a web page, the web page including a background content layer and the displaying includes displaying: (i) a scan window control, (ii) a visible region that presents information of the background content layer, and (iii) at least one hidden information region in a hide display state from being visible to a user of the terminal, wherein the scan window control is configured to be dragged to different regions on the web page and is configured to render the hidden information region in a display state in a position in which the scan window control is located thereby revealing the shielded information to be visible to the user;
    detecting, when the scan window control is dragged, whether an overlap exists between the scan window control and the hidden information region; and
    in accordance with a determination that an overlap exists between the scan window control and the hidden information region and the overlap region between the scan window control and the hidden information region is greater than a preset threshold,
        displaying the hidden information located in the hidden information region in its entirety to be visible to the user.

2. The method according to claim 1, further comprising:
    after detecting whether an overlap exists between the scan window control and the hidden information region:
        presenting, in accordance with a determination that an overlap exists between the scan window control and the hidden information region, preset prompt information, wherein the preset information comprises an animation effect based on the scan window control, and/or, an animation effect based on the web page, and/or, a preset prompt tone.

3. The method according to claim 1, further comprising:
    after displaying the hidden information located in the hidden information region in its entirety to be visible to the user:
        restoring display of original display content in the overlap region and rendering the hidden information located in the hidden information region in its entirety to be invisible to the user when the scan window control is dragged out of the hidden information region.

4. The method according to claim 1, further comprising:
performing a function corresponding to the overlap region between the scan window control and the hidden information region being greater than the preset threshold, wherein
the function corresponding to the preset threshold comprises at least one of displaying preset information, granting a qualification for participating in a preset activity, issuing a virtual tool, issuing an activation code, and granting a download permission.

5. A terminal, comprising:
one or more processors;
memory; and
one or more programs being stored in the memory, wherein the one or more programs, when executed by the one or more processors, cause the terminal to perform a plurality of operations including:
displaying a web page, the web page including a background content layer, and the displaying includes displaying: (i) a scan window control, (ii) a visible region that presents information of the background content layer, and (iii) at least one hidden information region in a hide display state from being visible to a user of the terminal, wherein the scan window control is configured to be dragged to different regions on the web page and is configured to render the hidden information region in a display state in a position in which the scan window control is located thereby revealing the shielded information to be visible to the user;
detecting, when the scan window control is dragged, whether an overlap exists between the scan window control and the hidden information region; and
displaying, in accordance with a determination that an overlap exists between the scan window control and the hidden information region and the overlap region between the scan window control and the hidden information region is greater than a preset threshold, the hidden information located in the hidden information region in its entirety to be visible to the user.

6. The terminal according to claim 5, wherein the plurality of operations further comprise:
after detecting whether an overlap exists between the scan window control and the hidden information region:
presenting, in accordance with a determination that an overlap exists between the scan window control and the hidden information region, preset prompt information, wherein the preset information comprises an animation effect based on the scan window control, and/or, an animation effect based on the web page, and/or, a preset prompt tone.

7. The terminal according to claim 5, wherein the plurality of operations further comprise:
after displaying the hidden information located in the hidden information region in its entirety to be visible to the user:
restoring display of original display content in the overlap region and rendering the hidden information located in the hidden information region in its entirety to be invisible to the user when the scan window control is dragged out of the hidden information region.

8. The terminal according to claim 5, wherein the plurality of operations further comprise:
performing a function corresponding to the overlap region between the scan window control and the hidden information region being greater than the preset threshold, wherein
the function corresponding to the preset quantity comprises at least one of displaying preset information, granting a qualification for participating in a preset activity, issuing a virtual tool, issuing an activation code, and granting a download permission.

9. A non-transitory computer readable storage medium storing one or more programs, wherein the one or more programs, when executed by a terminal having one or more processors, cause the terminal to perform a plurality of operations comprising:
displaying a web page, the web page including a background content layer, and the displaying includes displaying: (i) a scan window control, (ii) a visible region that presents information of the background content layer, and (iii) at least one hidden information region in a hide display state from being visible to a user of the terminal, wherein the scan window control is configured to be dragged to different regions on the web page and is configured to render the hidden information region in a display state in a position in which the scan window control is located thereby revealing the shielded information to be visible to the user;
detecting, when the scan window control is dragged, whether an overlap exists between the scan window control and the hidden information region; and
displaying, in accordance with a determination that an overlap exists between the scan window control and the hidden information region and the overlap region between the scan window control and the hidden information region is greater than a preset threshold, the hidden information located in the hidden information region in its entirety to be visible to the user.

10. The non-transitory computer readable storage medium according to claim 9, wherein the plurality of operations further comprise:
after detecting whether an overlap exists between the scan window control and the hidden information region:
presenting, in accordance with a determination that an overlap exists between the scan window control and the hidden information region, preset prompt information, wherein the preset information comprises an animation effect based on the scan window control, and/or, an animation effect based on the web page, and/or, a preset prompt tone.

11. The non-transitory computer readable storage medium according to claim 9, wherein the plurality of operations further comprise:
after displaying the hidden information located in the hidden information region in its entirety to be visible to the user:
restoring display of original display content in the overlap region and rendering the hidden information located in the hidden information region in its entirety to be invisible to the user when the scan window control is dragged out of the hidden information region.

12. The non-transitory computer readable storage medium according to claim 9, wherein the plurality of operations further comprise:
performing a function corresponding to the overlap region between the scan window control and the hidden information region being greater than the preset threshold, wherein the function corresponding to the preset quantity comprises at least one of displaying preset information, granting a qualification for participating in a preset activity, issuing a virtual tool, issuing an activation code, and granting a download permission.

* * * * *